United States Patent
Soeiro et al.

(10) Patent No.: US 9,543,855 B2
(45) Date of Patent: Jan. 10, 2017

(54) VOLTAGE SOURCE CONVERTER (VSC) WITH NEUTRAL-POINT-CLAMPED (NPC) TOPOLOGY AND METHOD FOR OPERATING SUCH VOLTAGE SOURCE CONVERTER

(71) Applicant: ALSTOM Technology Ltd, Baden (CH)

(72) Inventors: Thiago Batista Soeiro, Zürich (CH); Johann Walter Kolar, Zürich (CH); Per Ranstad, Vaxjo (SE); Jörgen Linner, Växjö (SE)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 13/669,058

(22) Filed: Nov. 5, 2012

(65) Prior Publication Data

US 2013/0272045 A1    Oct. 17, 2013

(30) Foreign Application Priority Data

Nov. 4, 2011   (EP) ..................... 11187801

(51) Int. Cl.
*H02M 7/487*  (2007.01)
*H02M 7/537*  (2006.01)
*H02M 1/00*   (2006.01)

(52) U.S. Cl.
CPC ............. *H02M 7/537* (2013.01); *H02M 7/487* (2013.01); *H02M 2001/0054* (2013.01); *Y02B 70/1491* (2013.01)

(58) Field of Classification Search
CPC ........ H02M 7/48; H02M 7/483; H02M 7/487; H02M 7/49; H02M 7/5387; H02M 2007/4835; H02M 7/42; H02M 7/44; H02M 7/537; H02M 7/5388; H02M 7/797; H02M 1/32; H02M 2001/322; H02M 2001/325; H02J 3/36; H02H 7/122; H02H 7/1222; H02H 7/1225; H02H 7/1227; H02H 7/125; H02H 7/1252; H02H 7/1255; H02H 7/1257; H02H 9/00; H02H 9/001; H02H 9/002; H02H 9/004; H02H 9/005; H02H 9/007; H02H 9/008; H02H 9/02; H02H 9/021; H02H 9/023; H02H 9/025; H02H 9/026; H02H 9/028

(Continued)

(56) References Cited

U.S. PATENT DOCUMENTS 4,270,163 A    5/1981   Baker
6,480,403 B1 * 11/2002  Bijlenga ............... H02M 7/487
                                                 363/132

(Continued)

FOREIGN PATENT DOCUMENTS

CN   101599713 A  * 12/2009
DE   102009039195 A1   3/2011

(Continued)

OTHER PUBLICATIONS

Thiago B Soeiro et al., "Comparison of 2-and 3-level active filters with enhanced bridge-leg loss distribution", Power Electronics and ECCE Asia (ICPE&ECCE), May 30, 2011, pp. 1835-1842, XP031956115, 2011 IEEE 8th International Conference, IEEE, Zurich, Switzerland.

(Continued)

*Primary Examiner* — Timothy J Dole
*Assistant Examiner* — Ivan Laboy Andino
(74) *Attorney, Agent, or Firm* — GE Global Patent Operation; Rita D. Vacca

(57) ABSTRACT

A Voltage Source Converter (VSC) (10) with Neutral-Point-Clamped (NPC) topology with one or more phases, com- (Continued)

prises an intermediate DC circuit having at least a first and a second capacitance connected in series between a positive terminal and a negative terminal, providing a central tap terminal between both capacitances, and at least one sub-circuit for generating one phase of an alternating voltage, each sub-circuit comprising an AC terminal for supplying a pulsed voltage; a circuit arrangement of the form of a conventional NPC converter, with a first series connection of at least two switches between said AC terminal and said positive terminal, a second series connection of at least two switches between said AC terminal said negative terminal, and switchable connections from said central tap terminal to the centers of both two-switch series connections; and additional first and second auxiliary switches assigned to said two-switch series connections.

2 Claims, 15 Drawing Sheets

(58) Field of Classification Search
USPC .......... 363/16–17, 65, 95–98, 131–132, 37–43,363/52–55, 56.01–56.02, 71, 84, 89, 123, 125,363/135–136
See application file for complete search history.

(56) References Cited

U.S. PATENT DOCUMENTS

| | | | |
|---|---|---|---|
| 6,490,185 B1* | 12/2002 | Yamanaka et al. ............. | 363/98 |
| 6,697,274 B2* | 2/2004 | Bernet ................. | H02M 7/487 363/132 |
| 7,508,640 B2* | 3/2009 | Knapp ................. | H02H 7/1225 361/18 |
| 8,427,010 B2* | 4/2013 | Bose ..................... | H02M 7/487 307/82 |
| 2006/0056209 A1* | 3/2006 | Blidberg .............. | H02M 7/487 363/63 |
| 2007/0153555 A1* | 7/2007 | Stulz ....................... | H02M 7/49 363/20 |
| 2008/0204959 A1* | 8/2008 | Knapp ................. | H02H 7/1225 361/100 |
| 2010/0141041 A1* | 6/2010 | Bose ..................... | H02M 7/487 307/82 |
| 2011/0013438 A1 | 1/2011 | Frisch | |
| 2011/0193412 A1 | 8/2011 | Lacarnoy | |
| 2012/0033474 A1* | 2/2012 | Temesi .................. | H02M 7/483 363/131 |
| 2012/0161858 A1* | 6/2012 | Permuy et al. .............. | 327/536 |
| 2012/0300514 A1* | 11/2012 | Kolar .................... | H02J 3/1857 363/41 |

FOREIGN PATENT DOCUMENTS

| | | |
|---|---|---|
| EP | 2413489 A1 | 2/2012 |
| WO | 2011154506 A2 | 12/2011 |

OTHER PUBLICATIONS

European Search Report, EP Patent Application No. 11187801.3, ALSTOM Technology, Ltd, Jul. 5, 2012, The Hague.
Nabae et al., "A New Neutral-Point-Clamped PWM Inverter", IEEE Transactions on Industry Applications, vol. No. 17, Issue No. 5, pp. 518-523, Oct. 1981.
Kaku et al., "Switching loss Minimized Space Vector PWM Method for IGBT Three-Level Inverter", IEE Proceedings. Electric Power Applications, vol. No. 144, Issue No. 3, pp. 182-190, May 1997.
Yuan et al., "Investigation on The Clamping Voltage Self-Balancing of the Three-Level Capacitor Clamping Inverter", IEEE Annual Power Electronics Specialists Conference, pp. 1059-1064, Feb. 1999.
Bruckner et al., "Loss Balancing In Three-Level Voltage Source Inverters Applying Active NPC Switches", IEEE Power Electron, pp. 1135-1140, 2001.
Teichmann et al., "A Comparison Of Three-Level Converters Versus Two-Level Converters for Low Voltage Drives, Traction, and Utility Applications", IEEE Transactions on Industry Applications., vol. No. 41, Issue No. 3, pp. 855-865, May-Jun. 2005.
Bruckner et al., "The Active NPC Converter and its Loss-Balancing Control," IEEE Transactions on Industrial Electronics, vol. No. 52, Issue No. 3, pp. 855-868, Jun. 2005.
Loh et al., "Comparative Evaluation of Pulsewidth Modulation Strategies for Z-Source Neutral-Point-Clamped Inverter", IEEE Transactions on Power Electronics, vol. No. 22, Issue No. 3, pp. 1005-1013, May 2007.
Bruckner et al., "Feedforward Loss Control of Three-Level Active NPC Converters", IEEE Transactions on Industry Applications, vol. No. 43, Issue No. 6, pp. 1588-1596, Nov. 2007.
Anzawa et al., "Power Cycle Fatigue Reliability Evaluation for Power Device Using Coupled Electrical-Thermal-Mechanical Analysis", pp. 815-821, May 2008.
Floricau et al., "Three-Level Active NPC Converter: PWM Strategies and Loss Distribution", pp. 3333-3338, Nov. 2008.
Friedli et al., "A Semiconductor Area Based Assessment of AC Motor Drive Converter Topologies", IEEE Applied Power Electronics Conference. and Exposition (APEC), pp. 336-342, Feb. 2009.
Li et al., "Three-Level Active Neutral-Point-Clamped (ANPC) Converter with Fault Tolerance Ability", in Proc. IEEE APEC, pp. 840-845, Feb. 2009.
Schweizer et al., "Comparison and Implementation of a 3-Level NPC Voltage Link Back-To-Back Converter with Sic and Si Diodes", IEEE Applied Power Electronics Conf. and Exposition (APEC), pp. 1527-1533, 2010.
Stupar et al., "Advanced Setup for Thermal Cycling of Power Modules following Definable Junction Temperature Profiles", International Power Electronics Conference IPEC, Sapporo, Japan, 2010.
Schweizer et al., "Comparison of the Chip Area Usage of 2-Level and 3-Level Voltage Source Converter Topologies", IEEE Industrial Electronics, 2010.
Zambra et al., "Comparison of Neutral-Point-Clamped, Symmetrical, and Hybrid Asymmetrical Multilevel Inverters", IEEE Transactions on Industrial Electronics., vol. No. 57, Issue No. 7, pp. 2297-2306, Jul. 2010.
Rodriguez et al., "A Survey On Neutral-Point-Clamped Inverters", IEEE Transactions on Industrial Electronics., vol. No. 57, Issue No. 7, pp. 2219-2230, Jul. 2010.
Lezana et al., "Survey on Fault Operation on Multilevel Inverters," IEEE Transactions on Industrial Electronics, vol. No. 57, Issue No. 7, pp. 2207-2218, Jul. 2010.
Abu-Rub et al., "Medium-Voltage Multilevel Converters—State of the Art, Challenges, and Requirements in Industrial Applications," IEEE Transactions on Industrial Electronics, vol. No. 57, Issue No. 8, pp. 2581-2596, Aug. 2010.
Kouro et al., "Recent Advances and Industrial Applications of Multilevel Converters", IEEE Transactions on Industrial Electronics, vol. No. 57, Issue No. 8, pp. 2553-2580, Aug. 2010.
Soeiro et al., "Novel 3-Level Hybrid Neutral-Point-Clamped Converter", IEEE Industrial Electronics (IECON), 2011.
Pereda et al., "High-Frequency Link: A Solution for Using Only One DC Source In Asymmetric Cascaded Multilevel Inverters", IEEE Transactions on Industrial Electronics., vol. No. 58, Issue No. 9, pp. 3884-3892, Sep. 2011.
European Office Action issued in connection with corresponding EP Application No. 11187801.3 on Aug. 4, 2016.

* cited by examiner

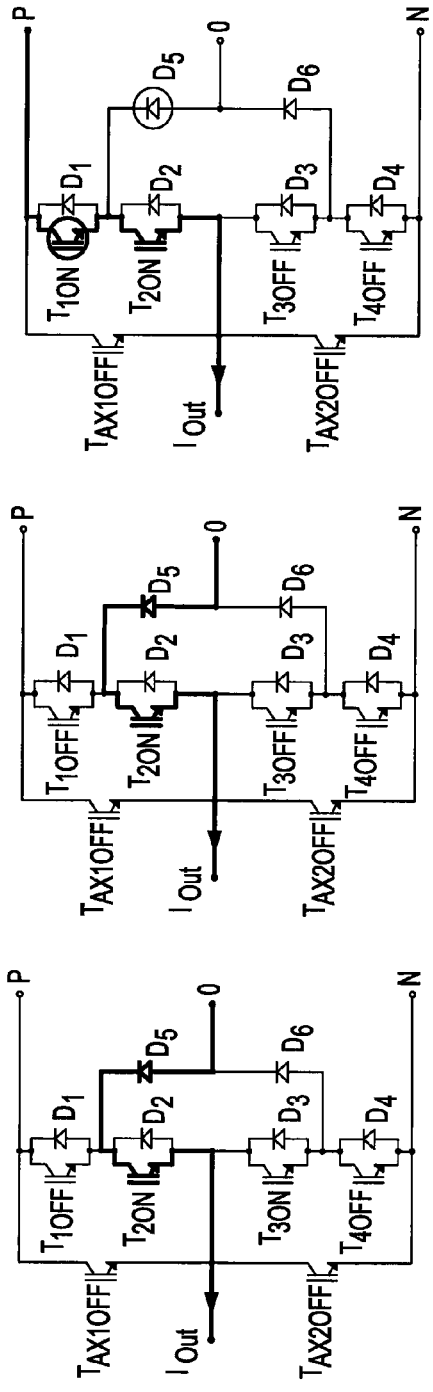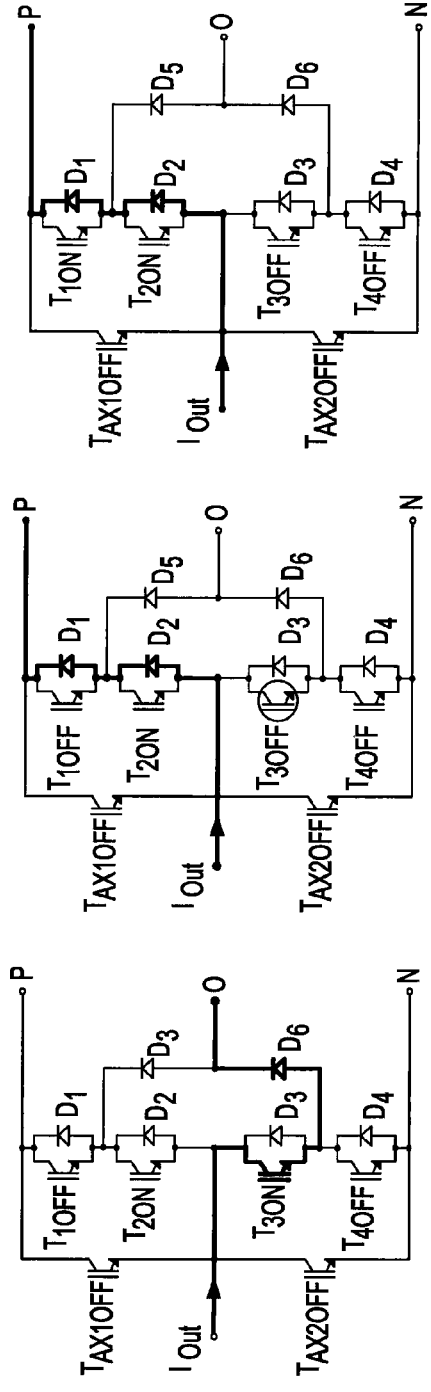
FIG. 3C
FIG. 3D

Conventional NPC: SVM Modulation

T-type NPC: SVM Modulation

Conventional NPC: SVM Modulation

T-type NPC: SVM Modulation

A-NPC: SVM Modulation

New 3-level VSC mode 2: SVM Modulation

FIG. 10A
FIG. 10B
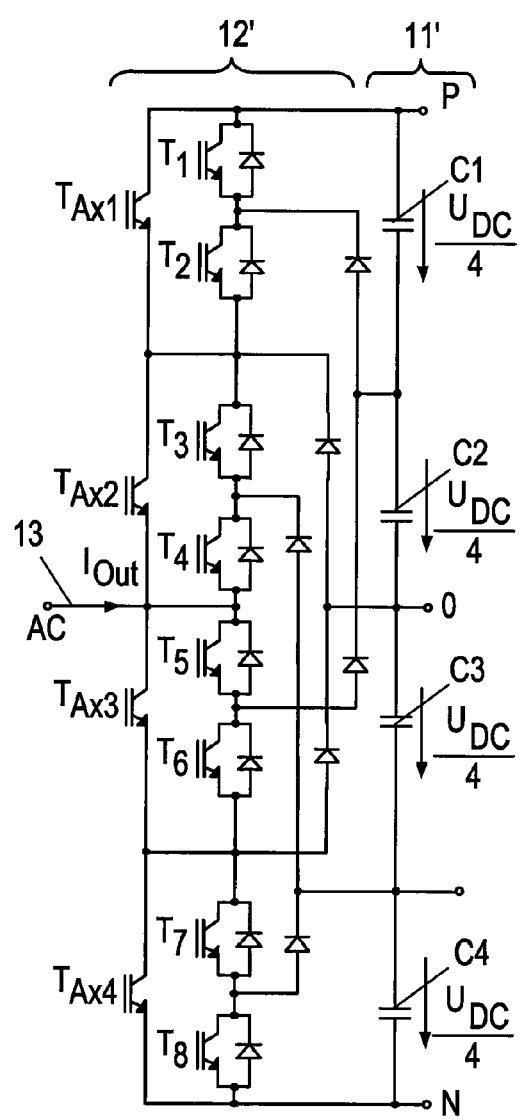
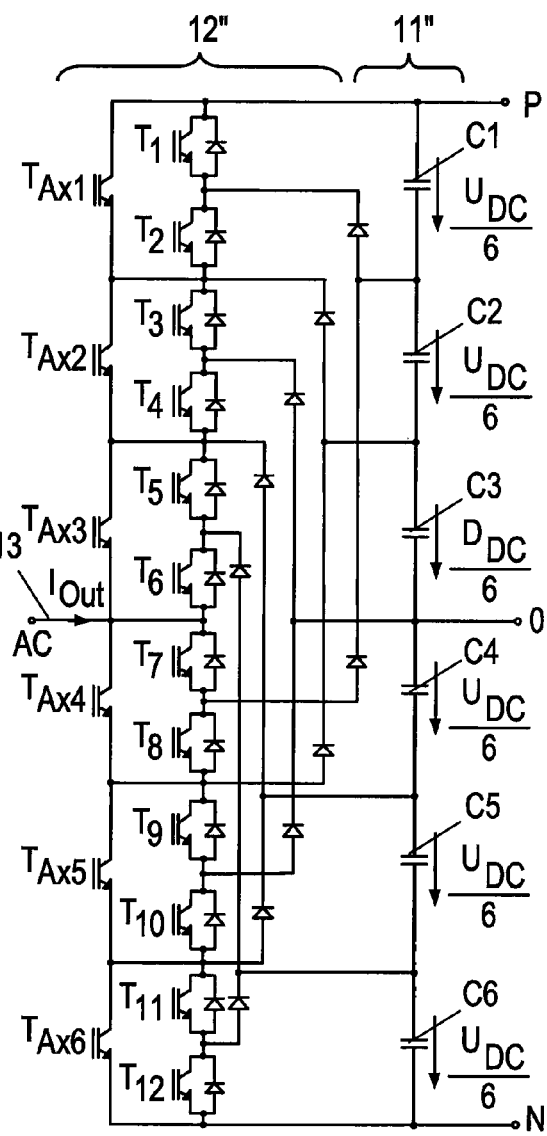

US 9,543,855 B2

VOLTAGE SOURCE CONVERTER (VSC) WITH NEUTRAL-POINT-CLAMPED (NPC) TOPOLOGY AND METHOD FOR OPERATING SUCH VOLTAGE SOURCE CONVERTER

CROSS REFERENCE TO RELATED APPLICATIONS

This application claims the benefit of European Patent Application No.: 11187801.3, filed on Nov. 4, 2011, which is incorporated herein by reference in its entirety.

DESCRIPTION

Voltage source converter (vsc) with neutral-point-clamped (npc) topology and method for operating such voltage source converter

BACKGROUND OF THE INVENTION

The present invention relates to the technology of electronic converters. It refers to a Voltage Source Converter (VSC) with Neutral-Point-Clamped (NPC) topology according to the preamble of claim 1. It also refers to a method for operating such a converter.

PRIOR ART 3-level Voltage Source Converters (VSCs), in the particular case of the widely-used-in-industry 3-level Neutral-Point-Clamped (NPC) topology proposed in Reference (1) and Reference (2) (see FIG. 1(a) with transistors T1-T4, diodes D1-D6, positive terminal P, negative terminal N and neutral point 0), are most often used in medium voltage range applications (e.g. rolling mills, fans, pumps, marine appliances, mining, tractions, and wind energy market; see Reference (3) and (4)). Recent investigations have shown that the 3-level NPC VSC is also a promising alternative for low-voltage applications (see Reference (5) and (6)).

Compared to the 2-level VSC shown in FIG. 1(b), the 3-level conventional NPC VSC features two additional active switches, two extra isolated gate drivers, and four diodes per phase leg. The 3-phase 3-level NPC VSC allows 27 switch states in the space-vector diagram, whereas the 2-level VSC allows eight switch states only (see Reference (4)). Hence, the clearly superior controllability of the phase currents and DC-link voltage ($U_{DC}$) are the most distinct advantages over the 2-level converter (see Reference (4)).

Additionally, in applications, such as photovoltaic grid inverters, rectifiers, motor drivers and active filters, 3-level conventional NPC and/or T-type NPC (see FIG. 1(c)) systems can achieve lower losses than 2-level converters, if the considered switching frequency is high enough (see Reference (6)). One substantial disadvantage of the conventional NPC and/or T-type VSCs is the commonly uneven loss distribution across the semiconductor devices and the resulting asymmetrical temperature distribution over their junctions.

The semiconductor chips assembled in a standard commercial 3-level NPC bridge leg module are mostly dimensioned and rated neglecting the loss distribution over the specific elements (see Reference (3)). In this manner, due to the issue of loss distribution, the usage of these devices often results in an oversized design with an expensive and weakly utilized semiconductor area (see Reference (6)).

In addition to this, modulation schemes used to enhance the system efficiency can contribute to the uneven loss distribution, making it even worse, increasing the difference of the operating temperature of the transistors and diodes inside the power module and/or widening their thermal cycling.

The thermal mismatch of components leads to induced thermal stresses on the materials within the module and thermo-mechanical damage could arise (see Reference (7) and (8)). Consequently, the design of 3-level NPC systems becomes rather complex as the desired characteristics of high power density, efficiency and component reliability could work against each other.

Due to the unequal distribution of losses and consequent mismatch of junction temperature distribution across the phase-leg's semiconductors, in the particular situation of high power converters, the usage of NPC power modules normally results in low semiconductor utilization (see Reference (4)). In this way, the usage of single semiconductor devices, rated differently, is more favourable in building the bridge-legs of the converter. NPC systems, employing single semiconductors similarly rated, usually have these devices installed in separate heat sinks, in order to achieve a good thermal decoupling of the individual components. Unfortunately, the usage of different single semiconductors and/or separate heating sinks normally results in increased cost and bulky systems.

Adding up to two extra active switches per phase leg of the conventional NPC leads to a substantial improvement in loss distribution, with the additional switching states and new commutations possibilities incorporated (see FIG. 1(d) with additional transistors $T_{Ax3}$ and $T_{Ax4}$, and References (4) and (9)). This configuration, known as Active NPC (A-NPC), allows a specific utilization of the upper and lower path of the neutral tap and, thus, affects the distribution of conduction and switching losses among the semiconductor devices (see Reference (9)). When compared to the conventional NPC topology, the A-NPC requires 6 extra active switches (two per leg) and 6 extra gate drives.

SUMMARY OF THE INVENTION

It is an object of the present invention to introduce a novel 3-level topology as an alternative to typical 2-level or 3-level VSC systems, which can achieve not only higher efficiency than the prior art topologies for the medium switching frequency range values, but can also overcome the loss distribution issues of the typical 3-level systems, so that a remarkable increase of the converter output power and/or system reliability can be accomplished.

This object and other objects are obtained by a voltage source converter according to claim 1 and a method according to claim 18.

The Voltage Source Converter (VSC) with Neutral-Point-Clamped (NPC) topology with one or more phases according to the invention comprises:

an intermediate DC circuit having at least a first and a second capacitance connected in series between a positive terminal and a negative terminal, providing a central tap terminal between both capacitances, and at least one sub-circuit for generating one phase of an alternating voltage, each sub-circuit comprising:

an AC terminal for supplying a pulsed voltage;

a circuit arrangement of the form of a conventional neutral-point-clamped converter, with a first series connection of at least two switches) between said AC terminal and said positive terminal, a second series connection of at least two switches between said AC terminal said negative terminal, and switchable connections from said central tap terminal to the centers of both two-switch series connections; and additional first and second auxiliary switches being assigned to said two-switch series connections.

According to an embodiment of the invention the first and second two-switch series connections each comprise two active switches in series connection, the switchable connections from said central tap terminal to the centers of both two-switch series connections each comprise a diode as a passive switch, and the additional first and second auxiliary switches are connected between said AC terminal and said positive and negative terminals, respectively. This embodiment is based on a conventional 3-level NPC.

According to another embodiment of the invention the first and/or second of said additional auxiliary switches have diodes or active switches connected in parallel.

According to another embodiment of the invention one or more active switches are connected from said first and second two-switch series connections to said central tap terminal. The NPC thus becomes an A-NPC.

According to another embodiment of the invention the first and second two-switch series connections each comprise an active switch and a diode in series connection, the switchable connections from said central tap terminal to the centers of both two-switch series connections each comprise a diode as a passive switch, and the additional first and second auxiliary switches are connected between said AC terminal and said positive and negative terminals respectively. This embodiment is based on a T-type NPC.

According to another embodiment of the invention the first and/or second of said additional auxiliary switches have diodes or active switches connected in parallel.

According to another embodiment of the invention one or more active switches are connected from said first and second two-switch series connections to said central tap terminal.

According to further embodiment of the invention
the intermediate DC circuit has four capacitances connected in series between the positive terminal and the negative terminal, providing the central tap terminal between said capacitances,
the at least one sub-circuit for generating one phase of an alternating voltage comprises:
within said first series connection at least four switches between said AC terminal and said positive terminal;
within said second series connection of at least four switches between said AC terminal and said negative terminal;
four additional auxiliary switches being connected in series between said positive and negative terminals, with connection of the AC terminal to the middle point of the series connection of the four additional auxiliary switches; and
one or more diode(s) connected between each series connection of said four capacitances and the series connections of said sub-circuit switches.

This is a 5-level NPC based on a configuration similar to the conventional 3-level NPC.

According to another embodiment of the invention any of the four additional auxiliary switches have diodes or active switches connected in parallel.

According to another embodiment of the invention one or more active switches are connected between each series connection of said four capacitances and the series connections of said sub-circuit switches.

According to further embodiment of the invention
the intermediate DC circuit has six capacitances connected in series between the positive terminal and the negative terminal, providing the central tap terminal between said capacitances,
the at least one sub-circuit for generating one phase of an alternating voltage comprises:
within said first series connection at least six switches between said AC terminal and said positive terminal;
within said second series connection at least six switches between said AC terminal and said negative terminal;
six additional auxiliary switches being connected in series between said positive and negative terminals, with connection of the AC terminal to the middle point of the series connection of the six additional auxiliary switches; and
one or more diode(s) connected between each series connection of said six capacitances and the series connections of said sub-circuit switches.

This is a 7-level NPC based on a configuration similar to the conventional 3-level NPC.

According to another embodiment of the invention any of the six additional auxiliary switches has diodes or active switches connected in parallel.

According to another embodiment of the invention one or more active switches are connected between each series connection of said six capacitances and the series connections of said sub-circuit switches.

According to another embodiment of the invention said first and second two-switch series connections each consist of two active switches in series connection.

According to another embodiment of the invention said first and second two-switch series connections each consist of two active switches in series connection, and said switches have diodes and/or active switches connected in parallel.

According to another embodiment of the invention the capacitances have all the same value.

According to another embodiment of the invention three sub-circuits are provided for feeding the output into a three-phase grid.

The method according to the invention is characterized in that each sub-circuit generates a pulse-modulated voltage signal at the respective AC terminal in order to generate an AC voltage.

BRIEF DESCRIPTION OF THE DRAWINGS

The present invention is now to be explained more closely by means of different embodiments and with reference to the attached drawings.

FIG. 1A shows a conventional 3-level NPC; FIG. 1B shows a 2-level VSC; FIG. 1C shows a T-type NPC, and FIG. 1D shows a 3-level A-NPC;

FIG. 2A shows a 3-level VSC; FIG. 2B shows a conventional NPC; FIG. 2C shows a T-type NPC; and FIG. 2D shows 2-level VSC operating modes;

FIGS. 3A-3D shows commutation steps in the proposed 3-level VSC for conventional NPC operation mode, where the FIG. 3A shows a switching transition (P1→0) for $I_{Out}>0$; FIG. 3B shows a switching transition (P1→0) for $I_{Out}<0$; FIG. 3C shows a switching transition (0→P1) for $I_{Out}>0$; and FIG. 3D shows a switching transition (0→P1) for $I_{out}<0$;

FIG. 4B shows a switching transition (P2→0) for $I_{out}$<0; FIG. 4C shows a switching transition (0→P2) for $I_{Out}$>0; and FIG. 4D shows a switching transition (0→P2) for $I_{out}$<0;

FIG. 8A shows a conventional NPC; FIG. 8B shows a T-type NPC; FIG. 8C shows a A-NPC; FIG. 8D shows a new 3-level VSC in mode 1 operations.

FIG. 9A shows conventional NPC; FIG. 9B shows a T-type NPC; FIG. 9C shows an A-NPC; and FIG. 9D shows a new 3-level VSC in mode 2 operation;

FIGS. 10A-10B shows two novel multilevel voltage source converters; where FIG. 10A shows a 5-level VSC, and FIG. 10B shows a novel 7-level VSC version; FIG. 11A shows an A-NPC; FIG. 11B shows a T-type NPC; FIG. 11C shows an alternative new 3-level VSC; and FIG. 11D shows an alternative new 3-level A-NPC.

DETAILED DESCRIPTION OF DIFFERENT EMBODIMENTS OF THE INVENTION

The 3-level conventional NPC VSC has several attractive features, which explain its remarkable success on the power electronics market (see Reference (10)). The main structural drawback of this converter, which was thoroughly studied in Reference (4) and References (9)-(13), is the uneven loss distribution and the resulting asymmetrical temperature distribution of the semiconductors' junctions.

Figure 1:
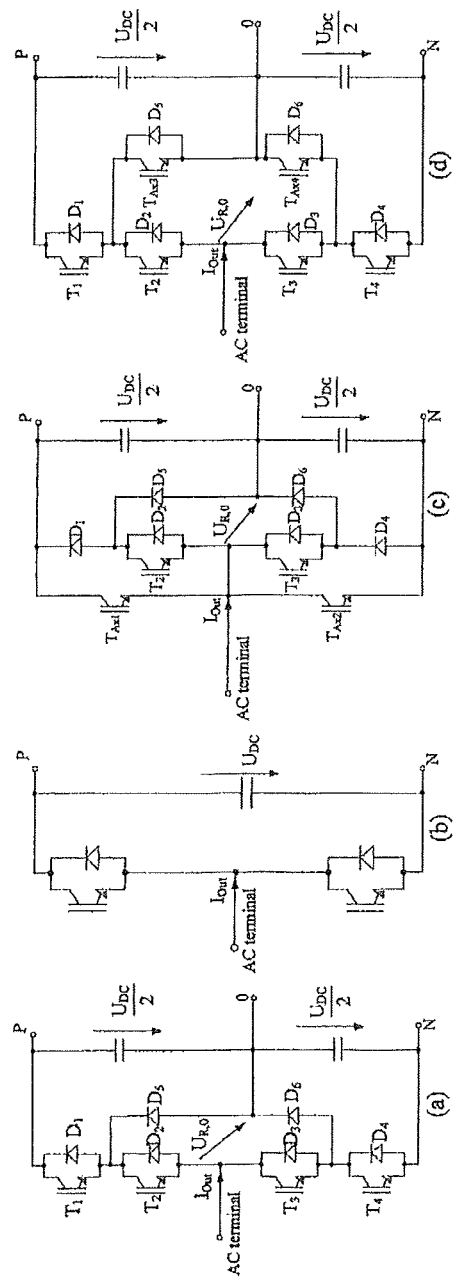
FIGS. 1A-1D shows various Voltage Source Converters (VSCs), where

Adding up two extra active switches per phase leg of the conventional NPC VSC (transistors $T_{Ax3}$ and $T_{Ax4}$ in FIG. 1(d)) allows a substantial improvement in the semiconductor loss distribution, with the additional switching states and new commutation possibilities incorporated (see Reference (4)). This configuration was introduced in Reference (14) and it is known in the literature as Active NPC (A-NPC). The A-NPC enables a specific utilization of the upper and lower path of the neutral tap and thus affects the distribution of conduction and switching losses among the semiconductor devices (see Reference (4)).

Figure 2A:
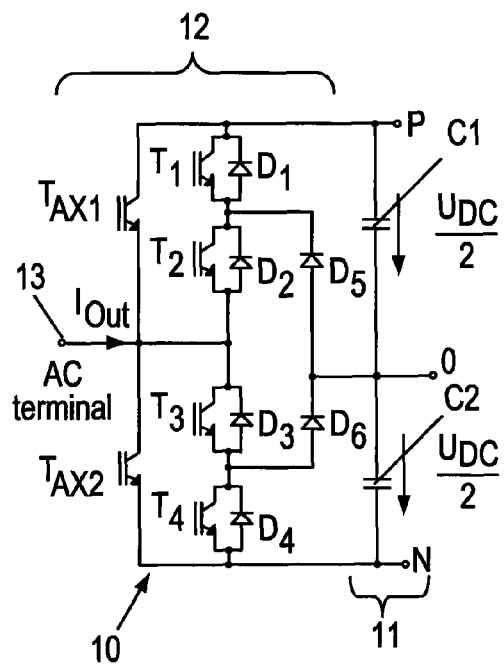
FIGS. 2A-2D shows an embodiment of the 3-level VSC topology featuring loss balancing capability where

In the present application, a novel 3-level VSC topology featuring loss balancing capability is proposed as an alternative to several active clamped 3-level topologies, including the conventional NPC and A-NPC. As for the A-NPC, the proposed system, an embodiment of which is shown in FIG. 2(a), requires two extra switches and gate drives when compared to the conventional NPC (per phase-leg). For operation in the low voltage converter range (below 1000V), in contrast to the A-NPC VSC, 1200V devices are employed as auxiliary switches (transistors $T_{Ax1}$ and $T_{Ax2}$ in FIG. 2(a)). The A-NPC would require two extra active switches, 600V rated, per phase leg.

Figure 2B:
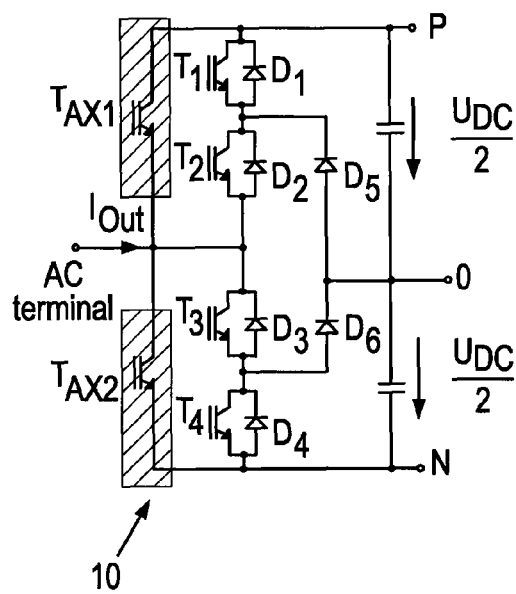
Figure 2C:
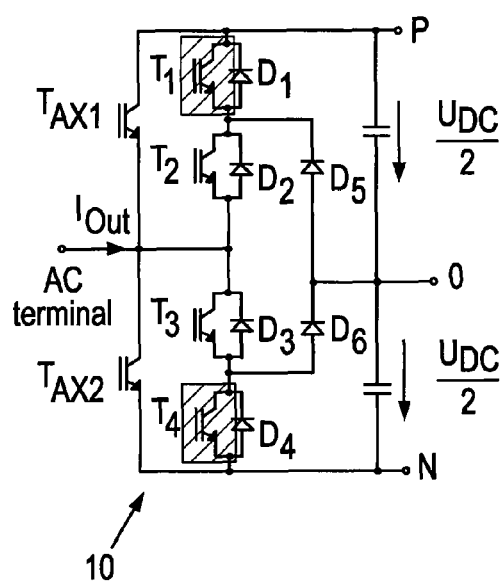

The strategically placed auxiliary switches, $T_{Ax1}$ and $T_{Ax2}$ of the new 3-level VSC 10 in FIG. 2(a), permit the proposed converter to operate as the conventional NPC (see FIG. 2(b) in comparison to FIG. 1(a)), and/or the T-type NPC (see FIG. 2(c) in comparison to FIG. 1(c)). In contrast to the A-NPC, which offers extra redundant zero states to the conventional NPC (central tap "0"), the new switches $T_{Ax1}$ and $T_{Ax2}$ in the proposed topology create redundant switch states to the "P" and "N" potentials or terminals.

Basically, during T-type NPC operation, the losses on the upper and bottom switches, transistors $T_1$ and $T_4$, can be alleviated. Therefore, the losses across the devices within the phase-leg can be strategically distributed.

During T-type NPC operation, conduction losses can be drastically reduced, as fewer devices exist in the current path. This characteristic allows a higher efficiency operation when compared to the NPC and/or A-NPC, which always contains two devices conducting.

In inverter operation, by proper selection of the positive and negative switching states, it is possible to improve the efficiency of the new 3-level VSC 10. The losses of the system can be distributed in such a way that the auxiliary switches, $T_{Ax1}$ and $T_{Ax2}$, only display conduction losses while the outer switches, $T_1$ and $T_4$, solely are stressed with switching losses. Hence, transistors with excellent on-state features could be selected for the auxiliary switches $T_{Ax1}$ and $T_{Ax2}$, while high speed devices would be more suitable for the outer switches $T_1$ and $T_4$.

Consider a single phase leg of the new 3-level VSC 10 shown in FIG. 2(a). The switching states of the proposed system are given in Table I, below. As can be noted, the redundant switch states "P1" and "N1" define the conventional NPC operation, while the states "P2" and "N2" match to the T-type VSC operation. Of course, switches $T_1$ and $T_{Ax1}$ could be turned on at once in order to connect the ac terminal to the "P" point of the DC-link, and in the same way switches $T_4$ and $T_{Ax2}$ could be turned on together to connect the ac terminal to the "N" point.

However, the current distribution between the two redundant paths would not be precisely defined. In these cases, the on-state characteristics of the devices being used, the prior switch state, and parasitic inductances would define the current path.

Figure 2D:
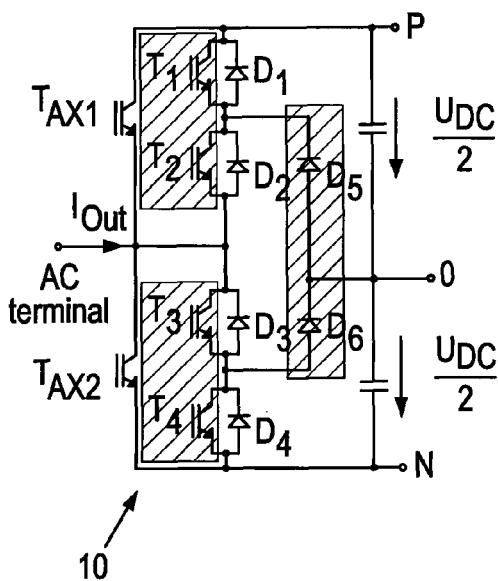

In the present invention, a special commutation is proposed, where T-type and conventional NPC operation are blended in order to improve the system efficiency. The switch states are shown in Table I as "P3" and "N3". Note that the direct commutation to or from the terminals "P" and "N" (P↔N), using "P1", "P2", "P3", "N1", "N2" or "N3", describes the 2-level VSC. FIG. 2(d) shows a suitable 2-level VSC operation (the switches or transistors, which are inactive in the respective operation mode, are hatched).

TABLE I

Switch States of the New 3-level VSC.

| Device | $T_1$ | $T_2$ | $T_3$ | $T_4$ | $T_{Ax1}$ | $T_{Ax2}$ | Operating mode |
|---|---|---|---|---|---|---|---|
| State P1 | 1 | 1 | 0 | 0 | 0 | 0 | NPC |
| State P2 | 0 | 1 | 0 | 0 | 1 | 0 | T-type |
| State P3 | 1 | 1 | 0 | 0 | 1 | 0 | NPC/T-type |
| State 0 | 0 | 1 | 1 | 0 | 0 | 0 | NPC/T-type |
| State N1 | 0 | 0 | 1 | 1 | 0 | 0 | NPC |

TABLE I-continued

Switch States of the New 3-level VSC.

| Device | $T_1$ | $T_2$ | $T_3$ | $T_4$ | $T_{Ax1}$ | $T_{Ax2}$ | Operating mode |
|---|---|---|---|---|---|---|---|
| State N2 | 0 | 0 | 1 | 0 | 0 | 1 | T-type |
| State N3 | 0 | 0 | 1 | 1 | 0 | 1 | NPC/T-type |

The commutations to or from the new states, incorporated in the conventional NPC VSC, determine the distribution of power losses across the semiconductor devices of the system. As for the conventional and active NPC, all commutations take place between one active switch and one diode, even if more than two devices turn-on or -off, only one active switch and one diode experience essential switching losses (see Reference (4)).

Figure 3A:
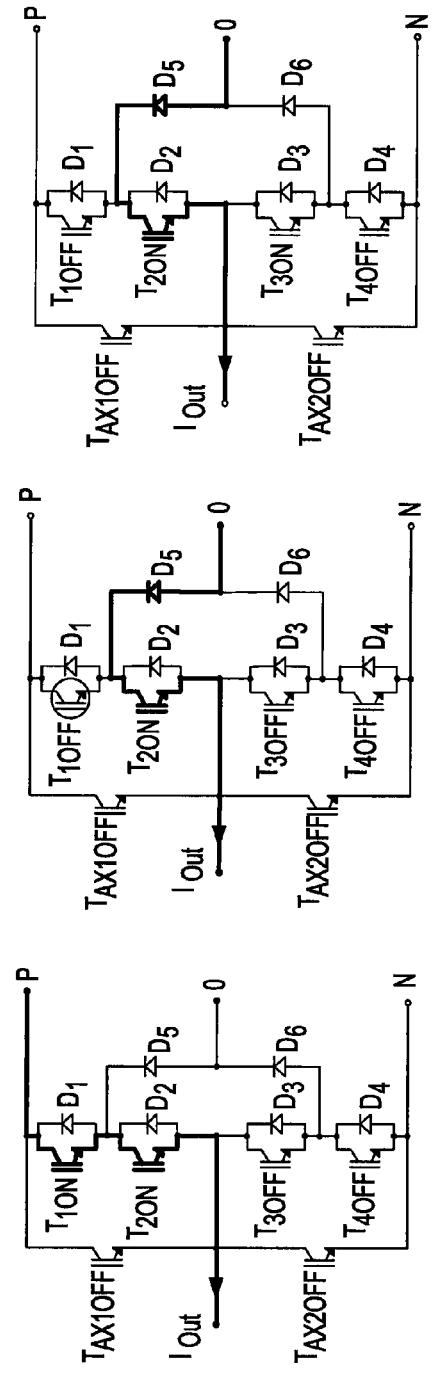
Figure 3B:
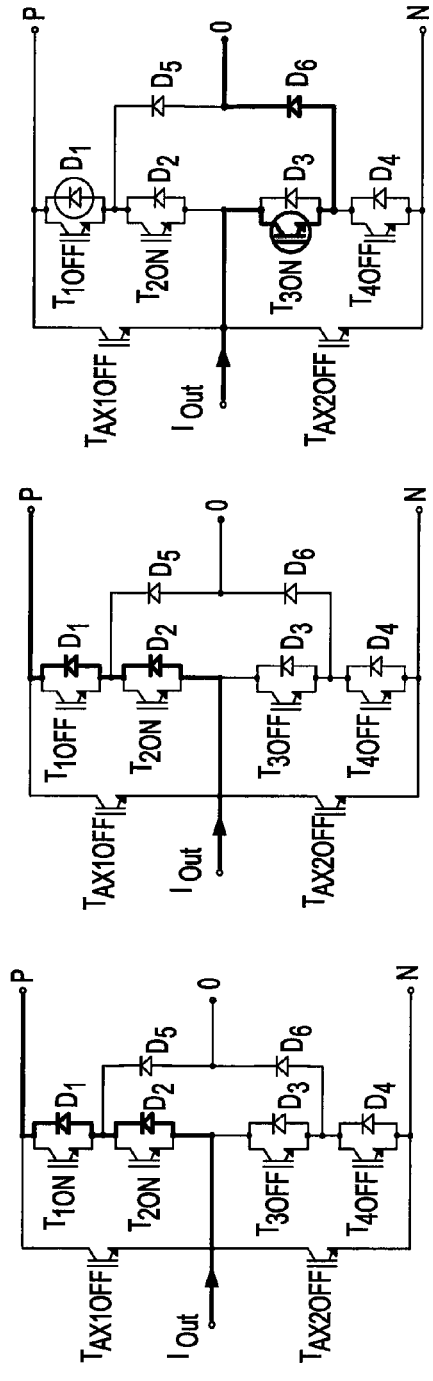
Figure 4A:
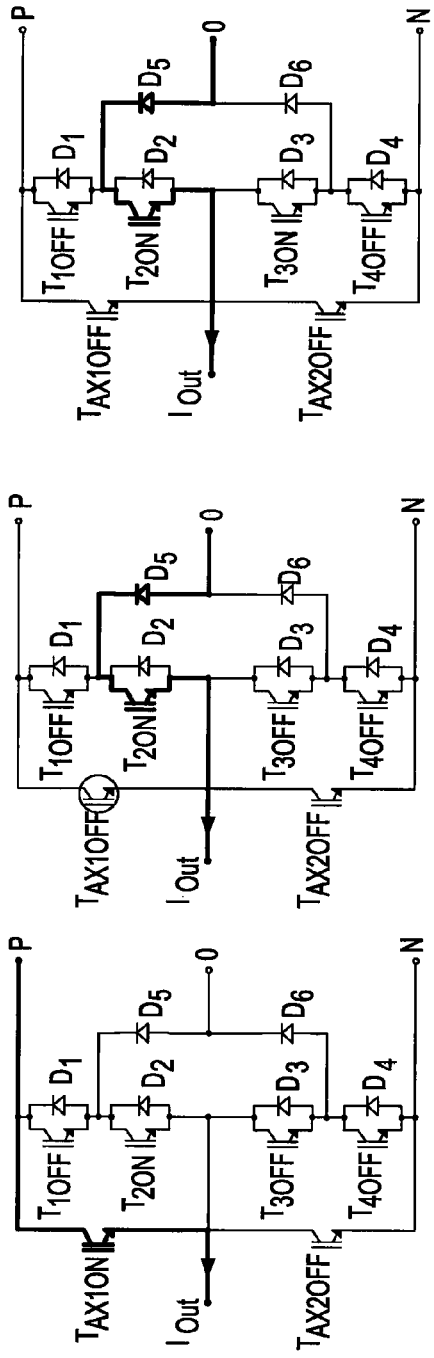
FIGS. 4A-4D depicts commutation steps in the proposed 3-level VSC for T-type operation mode, where the FIG. 4A shows a switching transition (P2→0) for $I_{out}$>0.
Figure 4B:
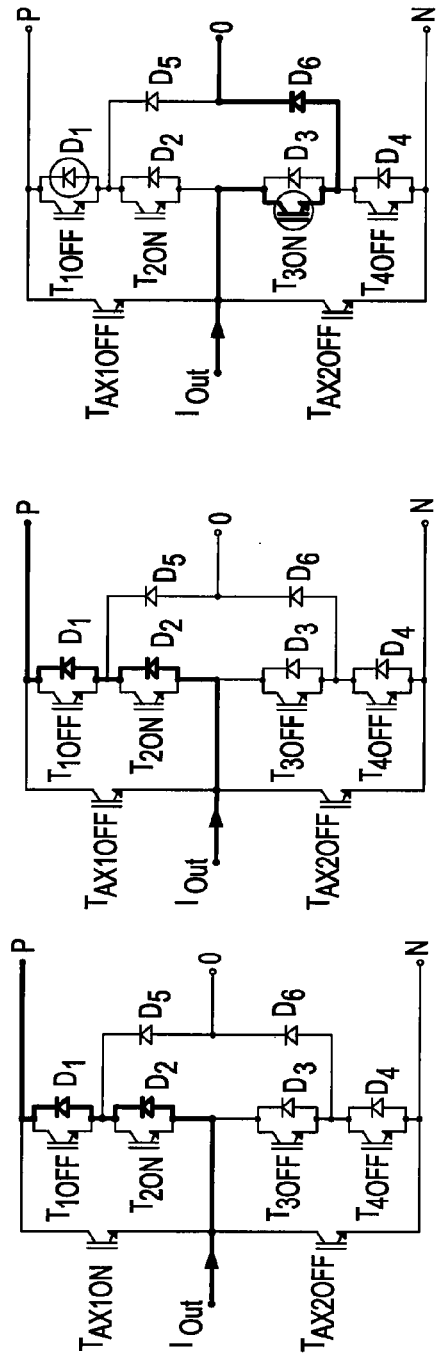
Figure 4C:
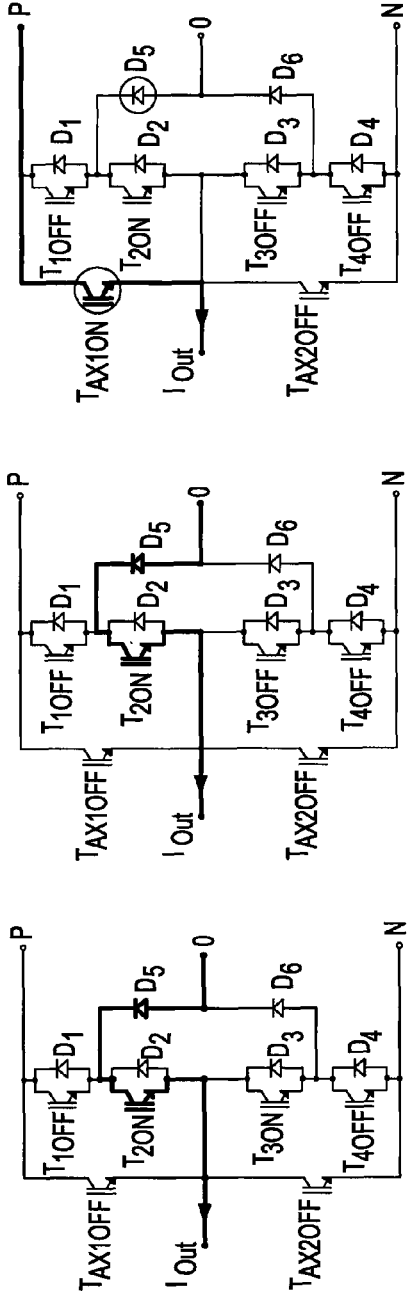
Figure 4D:
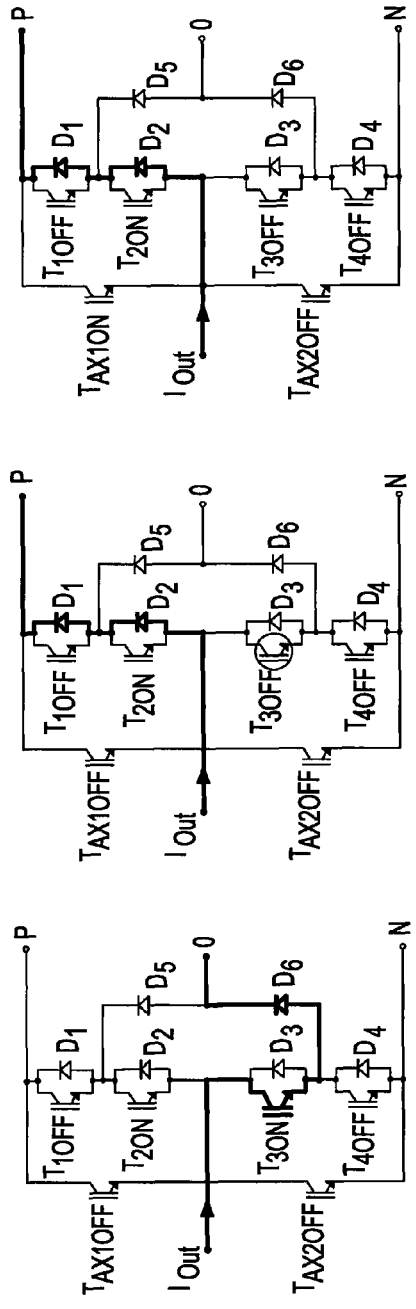

Assuming operating conditions where the ac terminal has impressed positive or negative current ($I_{Out}>0$ or $I_{Out}<0$) and positive output voltage, the commutations to or from "P1", "P2" and "0" are given as follows (see FIGS. 3 and 4):

a) Commutation "P1" to "0" (P1→0): This commutation starts when $T_1$ is turned off, and it finishes after a dead time, when $T_3$ is turned on. The switch $T_2$ stays on, while $T_{Ax1}$, $T_{Ax2}$ and $T_4$ stay off. If $I_{Out}>0$, as shown in FIG. 3(a), the current $T_{Out}$ commutates from $T_1$ to $D_5$ after $T_1$ is turned off, and essential turn-off losses occur at $T_1$. If $I_{Out}<0$, as shown in FIG. 3(b), the current $I_{out}$ commutates from $D_1/D_2$ to $T_3$ and $D_6$ after $T_3$ is turned on. Hence, $T_3$ and $D_1$ experience turn-on and recovery losses, respectively.

b) Commutation "0" to "P1" (0→P1): This commutation starts when $T_3$ is turned off, and it finishes after a dead time, when $T_1$ is turned on. The switch $T_2$ stays on, while $T_{Ax1}$, $T_{Ax2}$ and $T_4$ stay off. If $I_{Out}>0$, as shown in FIG. 3(c), the current $I_{Out}$ commutates from $D_5$ to $T_1$ during the turn-on of $T_1$. In this case, $T_1$ and $D_5$ experience turn-on and recovery losses, respectively. If $I_{Out}<0$, as shown in FIG. 3(d), the current $I_{Out}$ commutates from $D_6/T_3$ to $D_1/D_2$ during the turn-off of $T_3$. Therefore, essential turn off losses occur at $T_3$.

c) Commutation "P2" to "0" (P2→0): This commutation starts when $T_{Ax1}$ is turned off, and it finishes after a dead time, when $T_3$ is turned on. The switch $T_2$ stays on, while $T_1$, $T_4$ and $T_{Ax2}$ stay off. If $I_{out}>0$, as shown in FIG. 4(a), during the turn-off of $T_{Ax1}$ the current $I_{out}$ naturally commutates from $T_{Ax1}$ to $T_2$ and $D_5$, and essential turn off losses occur at $T_{Ax1}$. If $I_{out}<0$, as shown in FIG. 4(b), the current $I_{Out}$ commutates from $D_1/D_2$ to $T_3$ and $D_6$ after $T_3$ is turned on. Therefore, $T_3$ and $D_1$ experience turn-on and recovery losses, respectively.

d) Commutation "0" to "P2" (0→P2): This commutation starts when $T_3$ is turned off, and it finishes after a dead time, when $T_{Ax1}$ is turned on. The switch $T_2$ stays on, while $T_1$, $T_4$ and $T_{AX2}$ stay off. If $I_{out}>0$, as shown in FIG. 4(c), the current $I_{Out}$ commutates from $T_2$ and $D_5$ to $T_{Ax1}$ after $T_{Ax1}$ is turned on. In this case, $T_{Ax1}$ and $D_5$ experience turn-on and recovery losses, respectively. If $I_{Out}<0$, as shown in FIG. 4(d), $I_{Out}$ commutates from $D_6/T_3$ to $D_1/D_2$ after $T_3$ is turned off. Hence, essential turn off losses occur at $T_3$.

Figure 5:
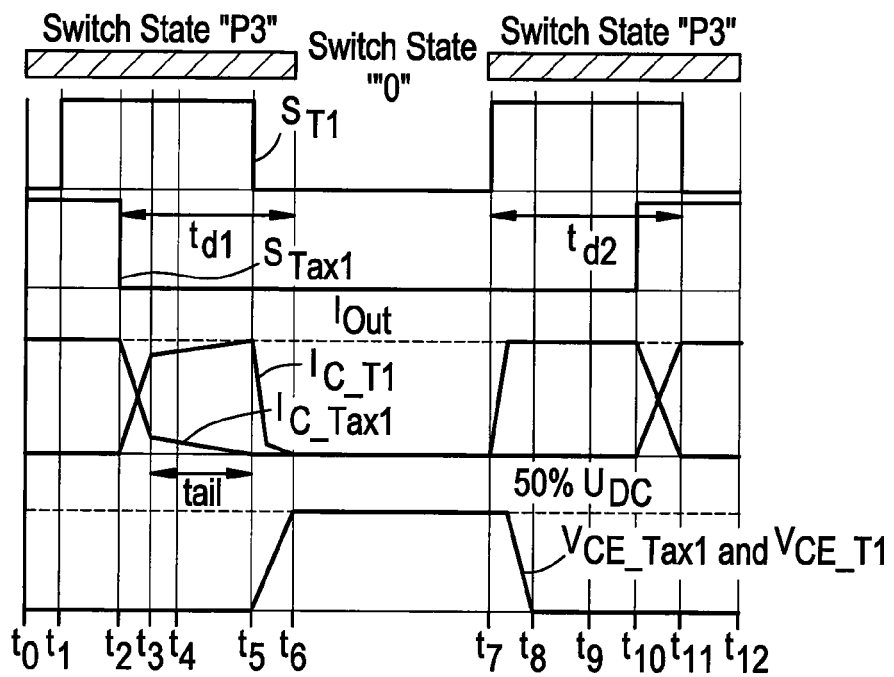
FIG. 5 shows commutation curves (P3↔0) of the proposed 3-level VSC, where $S_{T1}$ and $S_{Tax1}$ are the switching commands for transistors $T_1$ and $T_{Ax1}$, respectively, $I_{C\_T1}$ and $I_{C\_Tax1}$ are the collector currents across transistors $T_1$ and $T_{Ax1}$, respectively, and $V_{CE\_Tax1}$ is the collector-emitter voltage across transistor $T_{Ax1}$.

For the switch states "P3" and "N3" of Table I, particular attention has to be paid to the current distribution between the two redundant paths. For example, in case $T_1$ and $T_{Ax1}$ are turned on at once, the on-state characteristics of these devices, the prior switch state, and parasitic inductances would strongly influence the current distribution between these devices and their losses would not be precisely defined. In order to take advantage of the commonly good switching performance of the path $T_1/T_4$ and the usually superior on-state characteristic of the path $T_{Ax1}/T_{Ax2}$, the switching commutation to or from "P3" and "0" (P3↔0), as shown in FIG. 5, is considered for further analysis. In FIG. 5, $S_{T1}$ and $S_{Tax1}$ are the switching commands for $T_1$ and $T_{Ax1}$, respectively. $I_{C\_T1}$ and $I_{C\_Tax1}$ are the collector currents across $T_1$ and $T_{Ax1}$, respectively, and $V_{CE\_Tax1}$ is the collector-emitter voltage across transistor $T_{Ax1}$.

Therein, the optimum current transitions between $T_1$ and $T_{Ax1}$ are shown, where $T_1$ display mainly switching losses (turn-off: $t_5 \rightarrow t_6$, and turn on: $t_7 \rightarrow t_8$). $T_1$ suffers conduction losses only during the times $t_{d1}$ and $t_{d2}$: These time intervals must be selected considering the current "tail" of the slow switch in order to preserve the soft-switching feature in $T_{Ax1}$. Note that the interval $t_0 \rightarrow t_2$, with $t_1 \rightarrow t_2$ being very short, must be much bigger than $t_3 \rightarrow_5$ in order to ensure that the conduction losses during "P3" are mainly dissipated across $T_{Ax1}$.

Table II, below, summarizes the above commutation descriptions, where the distribution of the main switching losses for positive and negative currents is shown.

TABLE II

Device Switching Losses in the new 3-level VSC.

| Device | $T_1$ | $D_1$ | $T_2$ | $D_2$ | $T_3$ | $D_3$ | $T_4$ | $D_4$ | $D_5$ | $D_6$ | $T_{Aux1}$ | $T_{Aux2}$ | Commutation type |
|---|---|---|---|---|---|---|---|---|---|---|---|---|---|
| $I_{out} > 0$ | | | | | | | | | | | | | |
| (P1↔0) | X | | | | | | | | X | | | | Type 1 |
| (P2↔0) | | | | | | | | | X | | X | | Type 2 |
| (P3↔0) | X | | | | | | | | X | | | | Type 3 |
| (N1↔0) | | | X | | | | X | | | | | | Type 4 |
| (N2↔0) | | | X | | | | X | | | | | | Type 5 |
| (N3↔0) | | | X | | | | X | | | | | | Type 6 |
| $I_{out} < 0$ | | | | | | | | | | | | | |
| (P1↔0) | | X | | X | | | | | | | | | Type 1 |
| (P2↔0) | | X | | X | | | | | | | | | Type 2 |
| (P3↔0) | | X | | X | | | | | | | | | Type 3 |
| (N1↔0) | | | | | X | | | X | | | | | Type 4 |
| (N2↔0) | | | | | | | | X | | | | X | Type 5 |
| (N3↔0) | | | | | X | | | X | | | | | Type 6 |

As for the A-NPC, the general approach used to optimize the distribution of junction temperature across the semiconductors is always to keep the hottest devices as cool as possible (see Reference (4)). For real-time optimization, the junction temperatures of the main semiconductors need to be estimated, or measured every sampling time. Based on the temperatures and phase current information, a simple algorithm could select the appropriate commutations in order to alleviate losses from the hottest device for the coming switching period.

Therefore, a substantial improvement in the loss distribution can be achieved that enhances the reliability and/or power capability of the system. This feedback-controlled loss balancing method was previously proposed for the A-NPC VSC by References (4) and (9), and can be simply adapted to the present invention by the use of a decision chart for the commutations, as shown in Table III, below.

An alternative strategy to this loss balancing control is given by Reference (11), where the calculations of the losses and device temperatures are performed off-line for all relevant operation points, assuming a specific control and modulation strategy. Thus, the optimal ratio between the different types of commutations can be identified online as a function of a modulation index M, and the operating power factor, using a feed-forward controller and a stored lookup table (see Reference (11)).

In this new method a substantially simplified implementation of the loss balancing system can be achieved, as the complex real-time estimation of junction temperature is avoided. It is important to note that both loss-balancing schemes become more effective at increasing switching frequencies.

Figure 6:
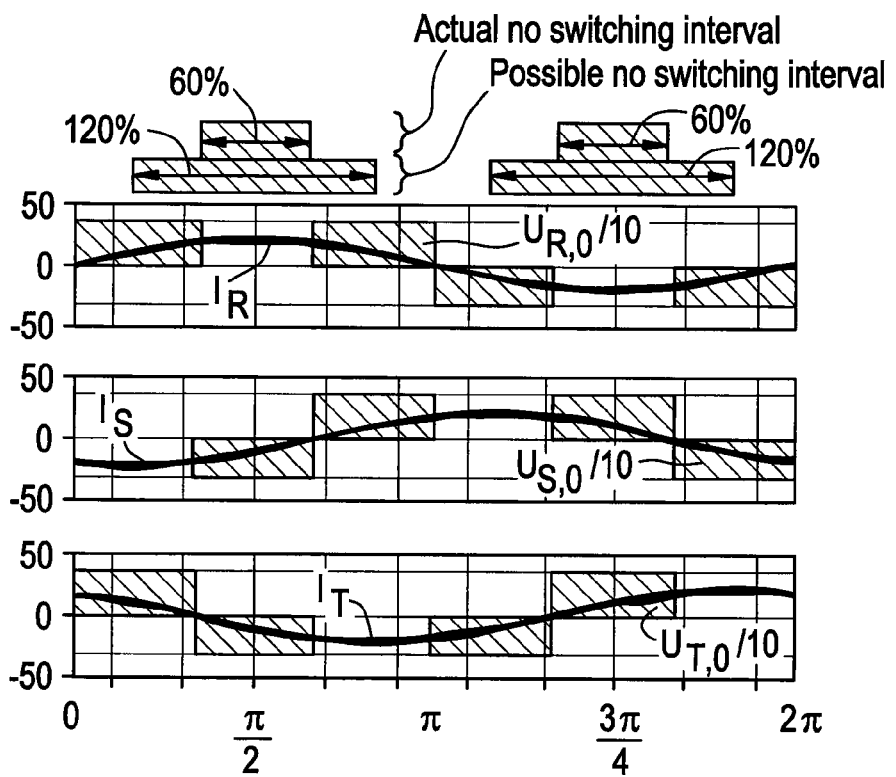
FIG. 6 shows phase currents and optimal clamping strategy for 10 kVA 3-phase, 3-level inverter operation with UDC=700V.

10 due to the possibility of combining the optimal clamping of the phase interval with the T-type operation. Therefore, conduction losses can be drastically reduced if similar technology and current rated devices are used for all active switches, as fewer devices exist in the current path. This characteristic affords more efficient operation, when compared to the conventional NPC and/or A-NPC, which always have two devices conducting in the current path. The clamping strategy, together with the resulting phase currents for 10 kVA inverter operation of the novel 3-level VSC, can be seen in FIG. 6, showing phase currents $I_R$, $I_S$ and $I_T$ and an optimal clamping strategy for a 10 kVA 3-phase 3-level inverter operation with $U_{DC}$=700V.

In order to quantify the feasibility of the proposed 3-level VSC topology, including the proposed loss minimized space vector modulation with loss-balancing control, an efficiency comparison between this system and other 10 kVA rated 3-phase inverters derived from the 2-level VSC, conventional NPC, T-type NPC and Active NPC, is presented. Suitable commercial semiconductors are considered in the analysis (IGBTs of the type IGW25T120 and IKW30N60T), where the loss data are obtained with a test setup. An optimized heat sink with thermal resistance of Rth=0.1K/W has been designed and considered in the thermal analysis. The thermal models of the devices are obtained directly in the datasheet, including the thermally conductive insulating material Hi-flow from Bergquist (Rth≈0.4K/W).

TABLE III

Decision Chart for the New 3-level VSC.

| Commutation | Phase current | Junction temperatures | | Operation |
|---|---|---|---|---|
| (P ↔ 0) | $I_{out} > 0$ | $\Delta T_{j\_T1} > \Delta T_{j\_T2}$ | $\Delta T_{j\_T1} > \Delta T_{j\_Taux1}$ | Ttype mode |
| | | | $\Delta T_{j\_T1} < \Delta T_{j\_Taux1}$ | NPC mode |
| | | $\Delta T_{j\_2} > \Delta T_{j\_T1}$ | $\Delta T_{j\_T2} > \Delta T_{j\_Taux1}$ | Ttype mode |
| | | | $\Delta T_{j\_T2} < \Delta T_{j\_Taux1}$ | NPC mode |
| | $I_{out} < 0$ | $\Delta T_{j\_T1} > \Delta T_{j\_T2}$ | | Type or NPC |
| | | $\Delta T_{j\_T2} > \Delta T_{j\_T1}$ | | Type or NPC |
| (N ↔ 0) | $I_{out} > 0$ | $\Delta T_{j\_T4} > \Delta T_{j\_T3}$ | | Type or NPC |
| | | $\Delta T_{j\_T3} > \Delta T_{j\_T4}$ | | Type or NPC |
| | $I_{out} < 0$ | $\Delta T_{j\_T4} > \Delta T_{j\_T3}$ | $\Delta T_{j\_T4} > \Delta T_{j\_Taux2}$ | Ttype mode |
| | | | $\Delta T_{j\_T4} < \Delta T_{j\_Taux2}$ | NPC mode |
| | | $\Delta T_{j\_T3} > \Delta T_{j\_T4}$ | $\Delta T_{j\_T3} > \Delta T_{j\_Taux2}$ | Ttype mode |
| | | | $\Delta T_{j\_T3} < \Delta T_{j\_Taux2}$ | NPC mode |

Several modulation and control strategies exist for the 3-level NPC topology, which could be used not only in the A-NPC but also in the proposed new 3-level VSC 10. As a reference, Rodriguez et al (Reference (10)) provide a survey of neutral-point-clamped converters, where many suitable strategies are listed. For the converter presented in this invention, a space vector modulation scheme incorporating an optimal clamping of the phase, as described in Reference (15), is implemented. The output voltage vector is always formed with the three nearest discrete voltage space vectors.

Since the 3-level topology offers redundant space vectors on the inner hexagon, it is possible to implement an optimal clamping strategy in order to reduce switching losses. In this modulation scheme, each phase leg of a 3-level VSC can have its switching operation stopped for 120° in one period without degrading the performance of the system (see Reference (15)). When aiming for high efficiency, especially during high operating frequency, one should avoid switching the phase leg with the highest current values, while keeping the loss distribution among the phase legs of the converter symmetric. It is important to point out that this modulation scheme is especially suitable for the proposed 3-level VSC Note that for an accurate analysis of the switching losses the information from the datasheets only would not be enough to enable a fair comparison of the studied systems. Due to the mismatch of voltage rated devices, e.g. during the T-type VSC operation, the turn-on energy of the 1200V IGBTs will be lower if the commutating diode is only 600V rated because of the considerably lower reverse recovery charge. Similarly, the 600V diodes turn-off loss energy will be higher due to the commutating 1200V IGBT. With the semiconductor loss data and the suitable modulation scheme pattern for the phase clamping, the losses from each device within a phase-leg can be directly obtained in a circuit simulator.

For the proposed VSC system two operation modes are considered in the analysis:
  a) High efficiency operation (mode 1): The losses of the system are distributed in such a way that the auxiliary switches, $T_{Ax1}$ and $T_{Ax2}$, only display conduction losses while the outer switches, $T_1$ and $T_4$, are solely stressed with switching losses.
  b) Loss balanced operation (mode 2): The operation mode, T-type or NPC, is defined by the real-time calculation of the junction temperature of the switches following the algorithm presented in Table III.

Figure 7:
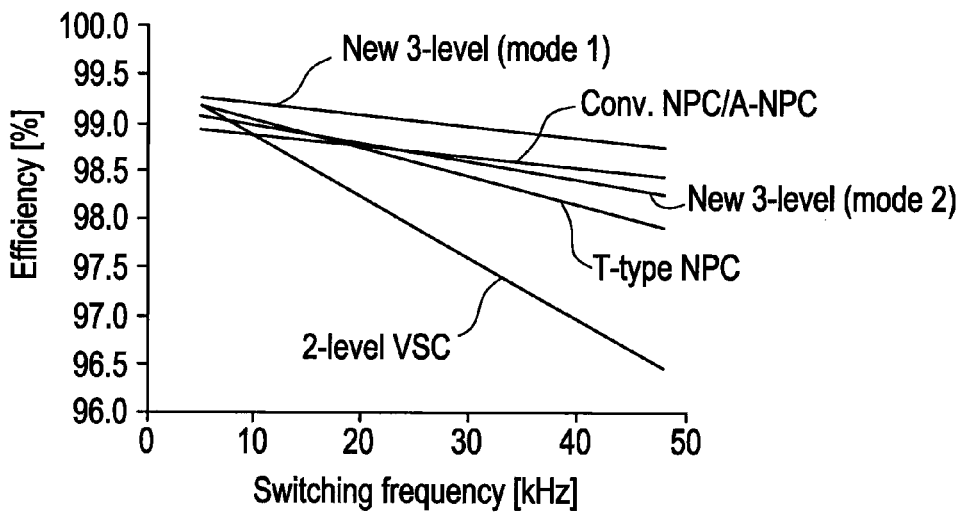
FIG. 7 depicts an efficiency comparison between the different topologies of 10 kVA inverters employing commercial semiconductors (operating with: unitary power factor; output voltage peak $U_{Out\_pk}$=325V; and phase current peak $I_{out\_pk}$=20.5A)
Figure 8A:
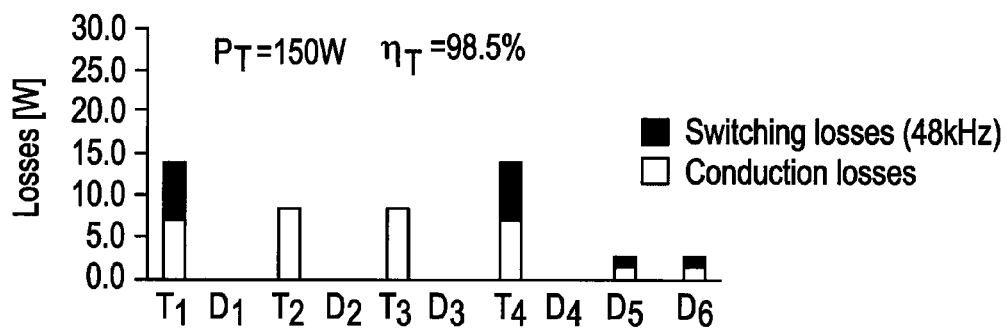
FIGS. 8A-8D shows the loss distribution between bridge leg components; where
Figure 8B:
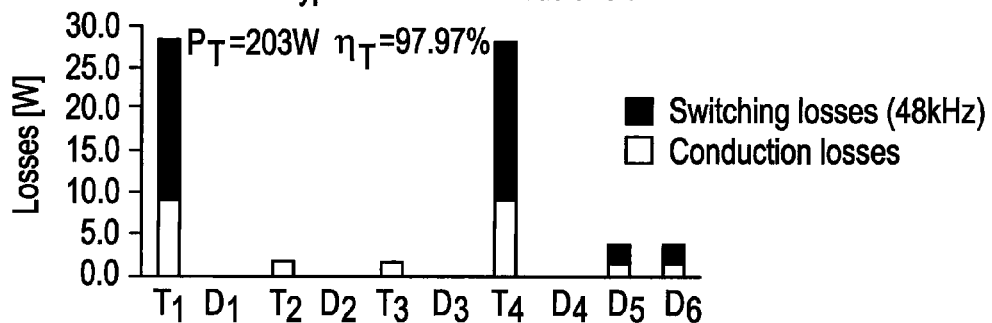
Figure 8C:
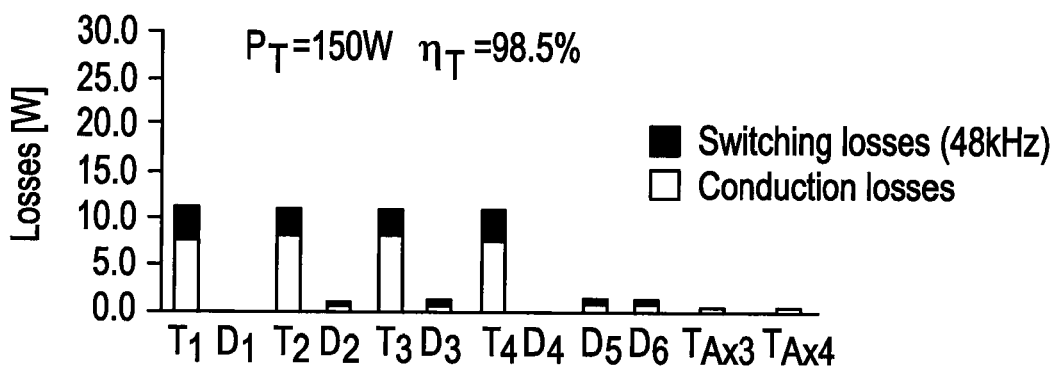
Figure 8D:
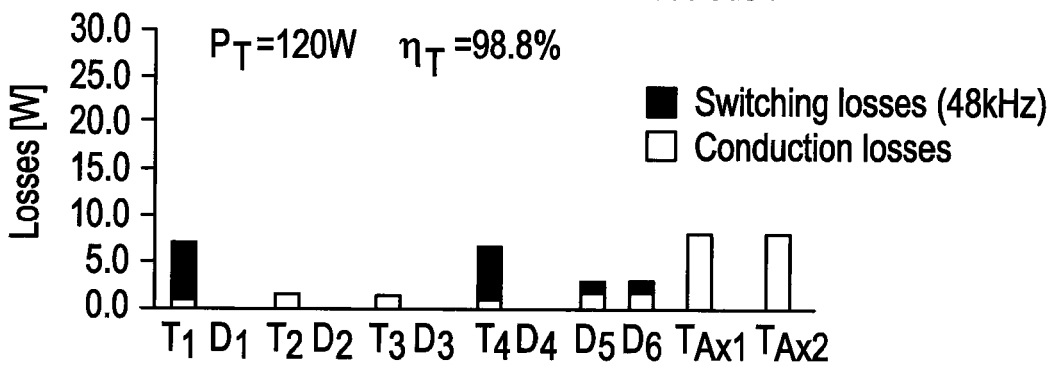
Figure 8E:
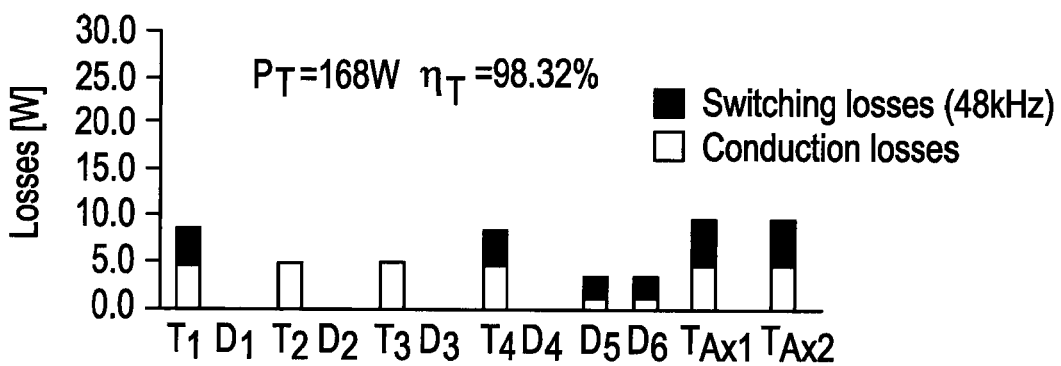
FIG. 8E shows a new 3-level VSC in mode 2 operations.
Figure 9A:
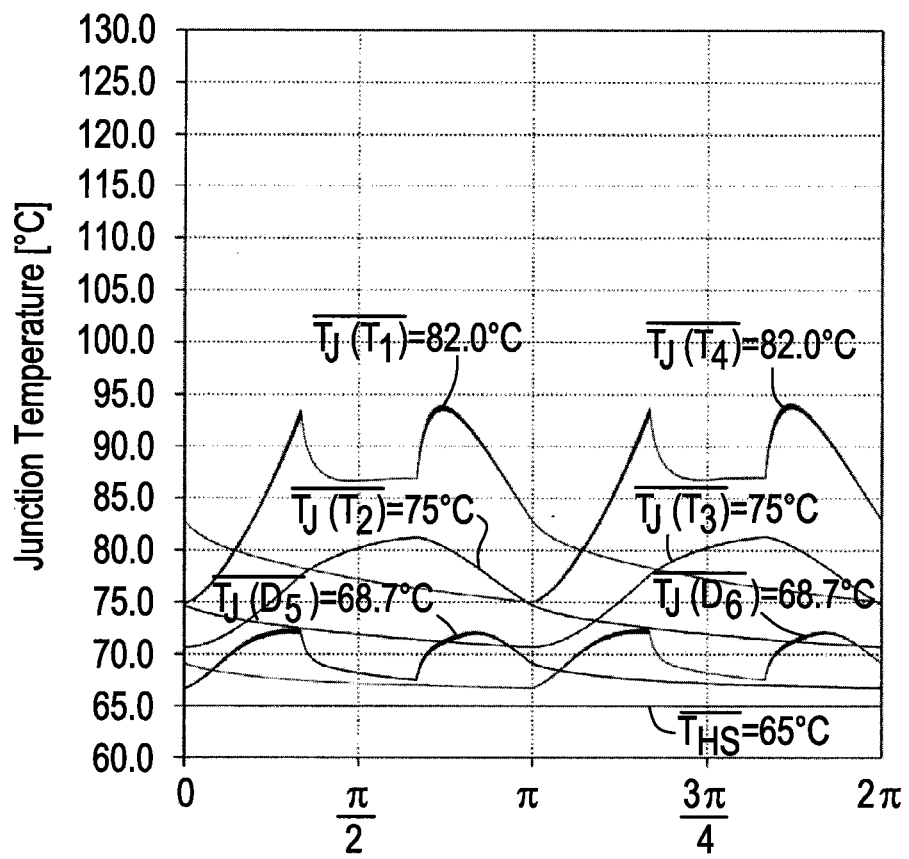
FIGS. 9A-9D depict phase-leg components operating/ averaged junction temperature for 3-phase 3-level inverters.
Figure 9B:
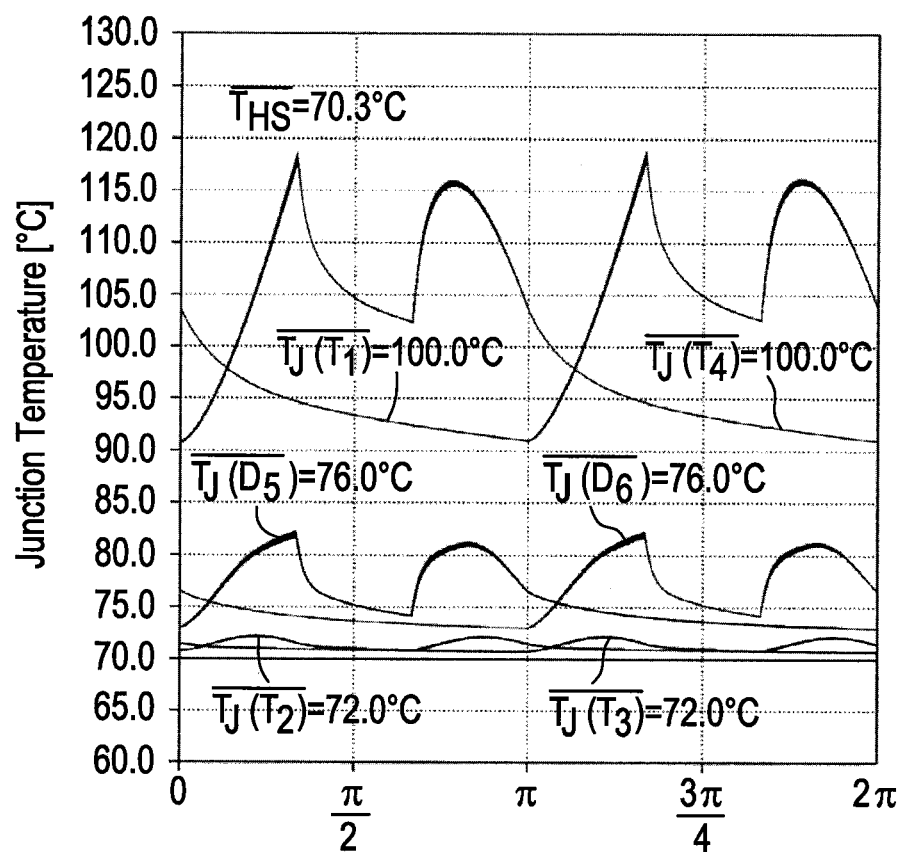
Figure 9C:
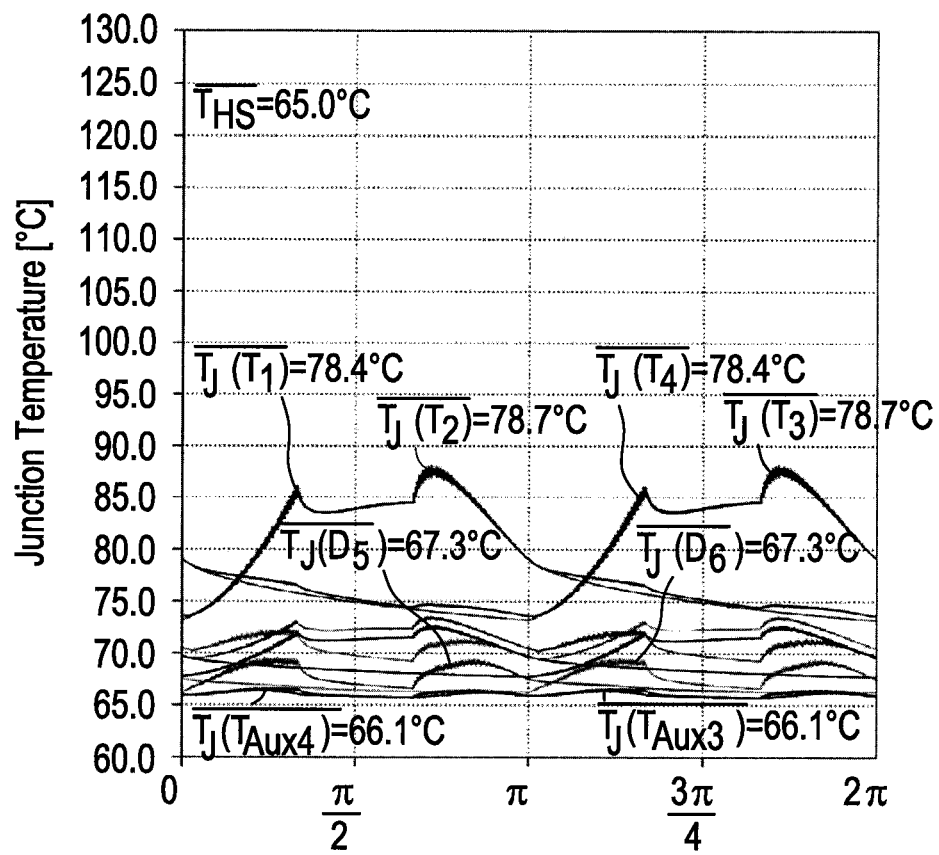
Figure 9D:
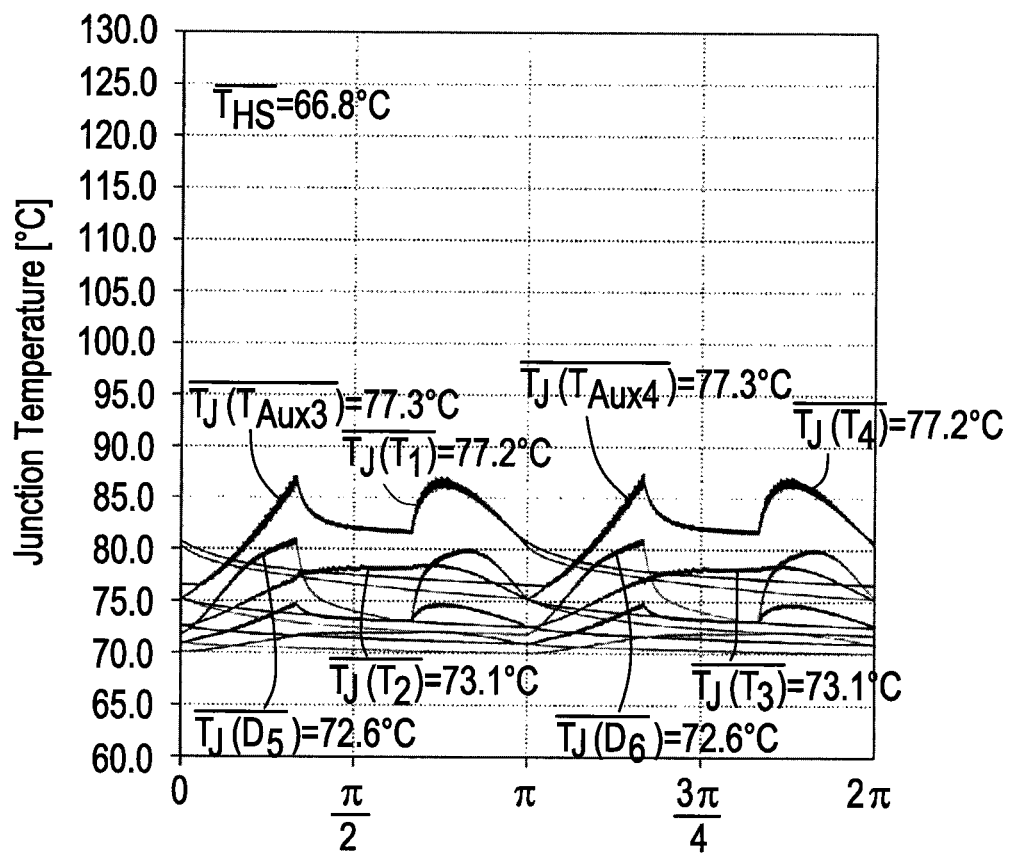

In FIG. 7 the pure semiconductor efficiency of the studied inverters is presented for operation in the switching frequency range of 5 kHz to 48 kHz and low DC-link voltage level ($U_{DC}$=700V). The efficiency comparison is between the different topologies of 10 kVA inverters employing commercial semiconductors (operating with a unitary power factor, an output voltage peak $U_{out\_pk}$=325V and a phase current peak $I_{out\_pk}$=20.5A).

For each system, the resulting averaged power loss distribution of the individual elements in a phase leg for 48 kHz switching frequency operation is shown in FIG. 8. Finally, the simulated junction temperatures $T_J$ for the proposed VSC system operating in mode 2 and for other 3-level VSC systems are shown in FIG. 9, where a constant ambient temperature, $T_A$, of 50° C. is assumed in the analysis. The temperature distribution across the heat sink, $T_{HS}$, is regarded as uniformly distributed.

As can be seen in FIG. 8, during high switching frequency operation, the loss distribution across the switches of the T-type inverter are very different. Additionally, among the 3-level topologies, this system exhibits the lowest efficiency, $\eta_T$. The 3-level A-NPC achieves an outstanding loss distribution performance, enabling the main semiconductor chips for IGBTs or diodes to operate with similar junction temperatures. The A-NPC and the conventional NPC systems display very similar total semiconductor loss, $P_T$. This happens, because in both systems during each commutation one diode and one active switch always experience essential switching and conduction losses (see Reference (4)).

As can be noticed in FIG. 7, the new 3-level system operating in mode 1 can always achieve higher efficiency than a conventional NPC, T-type NPC and/or A-NPC. However, as shown in FIG. 8, differently to the A-NPC, the power losses across the transistors $T_1$, $T_z$, $T_3$ and $T_4$ are not equalized. Additionally, the New 3-level VSC operating with balanced loss (mode 2), only displays better performance than the A-NPC for switching frequencies below 25 kHz. Due to the fact that the A-NPC cannot balance the losses across the auxiliary switches, a better thermal distribution among all the devices could be achieved with the new system. Note that the loss balancing algorithm of Table III aims to distribute the losses between $T_1$ and $T_2$ ($T_3$ and $T_4$), but it does not permit the auxiliary switches to be more thermally stressed than these devices. This is the reason that the junction temperature $T_J$ across the NPC switches are not even for the 48 kHz operation (see FIG. 9). In fact, without the loss limitation of the auxiliary switches, the thermal profile of the switches $T_1$ and $T_2$ ($T_3$ and $T_4$) would be indeed equalized; however the auxiliary switches would face very high losses during high operating switching frequency.

It is important to point out that multilevel VSCs, with loss-balancing control characteristic, can be derived from the proposed 3-level VSC version 10 shown in FIG. 2(a). As examples, FIGS. 10(a) and 10(b) show 5- and 7-level VSC configurations, respectively, comprising auxiliary switches $T_{Ax1}$-$T_{Ax4}$ and transistors $T_1$-$T_8$, and auxiliary switches $T_{Ax1}$-$T_{Ax6}$ and transistors $T_1$-$T_{12}$, respectively.

Other new 3-level VSCs featuring loss balancing characteristics are shown in FIG. 11. For instance, adding up to two extra active switches per phase leg of the active NPC of FIG. 1(d) ($T_{Ax1}$ and $T_{Ax2}$), a very high efficient 3-level VSC topology with outstanding semiconductor loss distribution is derived. This topology is shown in FIG. 11(a). Eventually, in this relatively complex topology, multiple additional switching states and new commutation possibilities are incorporated to the conventional NPC, which gives much more controllability of the semiconductor losses when compared to the A-NPC (see FIG. 1(d)) or the new 3-level VSC (see FIG. 2(a)).

Figure 11A:
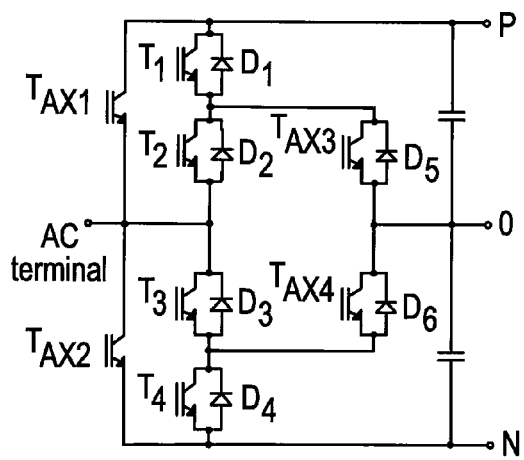
FIGS. 11A-11D shows novel 3-level VSCs; where
Figure 11B:
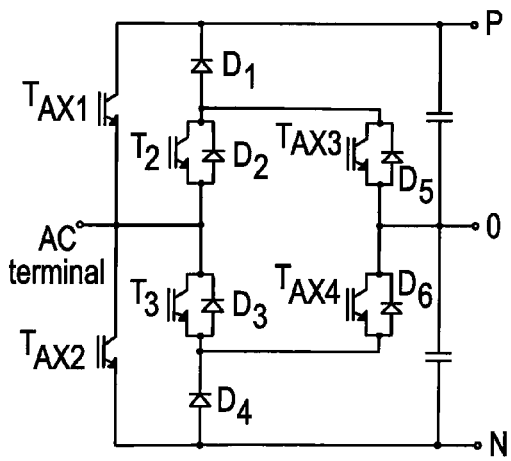
Figure 11C:
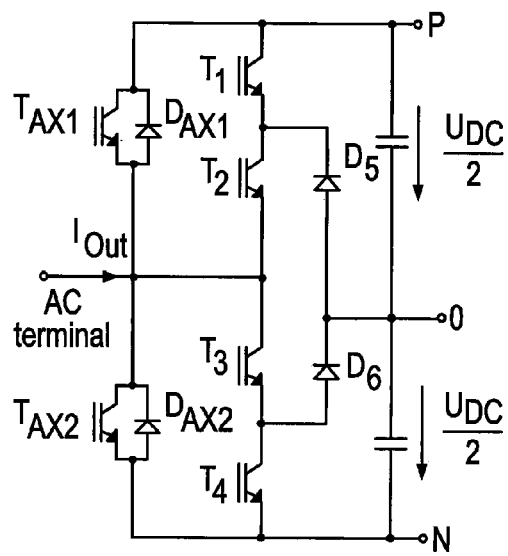
Figure 11D:
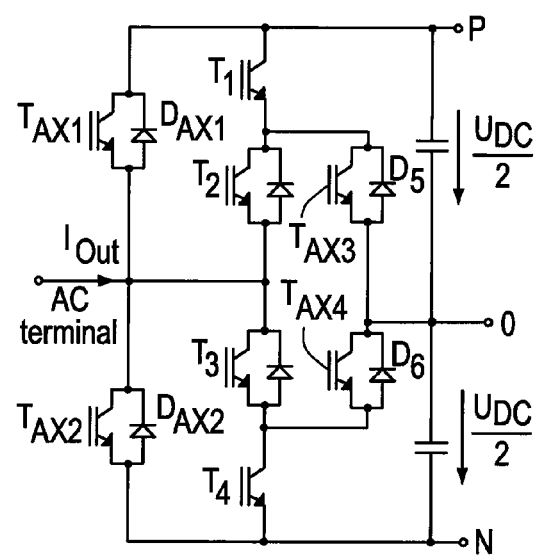

A new voltage source converters featuring loss balancing characteristics based on a T-type NPC VSC is proposed in FIG. 11(b). An alternative configuration of the new 3-level VSC (see FIG. 2(a)) is shown in FIG. 11(c). Finally, an alternative configuration for the 3-level converter presented in FIG. 11(a) is shown in FIG. 11(d).

REFERENCES (1) R. H. Baker, "Bridge converter circuit," U.S. Pat. No. 4,270,163, May 26, 1981.
(2) Nabae, I. Takahashi, and H. Akagi, "A new neutral-point-clamped PWM inverter," *IEEE Trans. Ind. Appl.*, vol. 17, no. 5, pp. 518-523, September/October 1981.
(3) M. Schweizer, T. Friedli, and J. W. Kolar, "Comparison and implementation of a 3-level npc voltage link back-to-back converter with sic and si diodes," in *Proc. Twenty-Fifth Annual IEEE Applied Power Electronics Conf. and Exposition (APEC)*, pp. 1527-1533, 2010.
(4) T. Brückner, S. Bernet, and H. Güldner, "The active npc converter and its loss-balancing control," *IEEE Trans. Ind. Electron.*, vol. 52, no. 5, pp. 855-868, June 2005.
(5) R. Teichmann and S. Bernet, "A comparison of three-level converters versus two-level converters for low voltage drives, traction, and utility applications," *IEEE Trans. Ind. Appl.*, vol. 41, pp. 855-865, May-June 2005.
(6) M. Schweizer, I. Lizama, T. Friedli, and J. W. Kolar, "Comparison of the chip area usage of 2-level and 3-level voltage source converter topologies," in *Proc. 36th Annual Conf. of IEEE Industrial Electronics (IECON)*, 2010.
(7) Stupar, D. Bortis, U. Drofenik, and J. W. Kolar, "Advanced setup for thermal cycling of power modules following definable junction temperature profiles," IPEC, Sapporo, Japan, 2010.
(8) T. Anzawa, Q. Yu, M. Yamagiwa, T. Shibutani, and M. Shiratori, "Power cycle fatigue reliability evaluation for power device using coupled electrical-thermal-mechanical analysis," *Thermal and Thermomechanical Phenomena in Electronic Systems*, 2008. ITHERM 2008. 11*th Intersociety Conference on*, vol., no., pp. 815-821, 28-31 May 2008.
(9) T. Brückner and S. Bernet, "Loss balancing in three-level voltage source inverters applying active NPC switches," in *Proc. IEEE Power Electron. Spec. Conf.*, Vancouver, BC, Canada, 2001, pp. 1135-1140.
(10) J. Rodriguez, S. Bernet, P. K. Steimer, and I. E. Lizama, "A survey on neutral-point-clamped inverters," *IEEE Trans. Ind. Electron.*, vol. 57, no. 7, pp. 2219-2230, July 2010.
(11) T. Brückner, S. Bernet, and P. K. Steimer, "Feedforward loss control of three-level active NPC converters," *IEEE Trans. Ind. Appl.*, vol. 43, no. 6, pp. 1588-1596, November/December 2007.
(12) J. Li, A. Q. Huang, S. Bhattacharya, and G. Tan, "Three-level active neutral-point-clamped (ANPC) converter with fault tolerance ability," in *Proc. IEEE APEC*, February 2009, pp. 840-845.

(13) D. Floricau, E. Floricau, and G. Gateau, "Three-level active NPC converter: PWM strategies and loss distribution," in *Proc. IEEE IECON*, November 2008, pp. 3333-3338.

(14) X. Yuan, H. Stemmler, and I. Barbi, "Investigation on the clamping voltage self-balancing of the three-level capacitor clamping inverter," in *Proc. IEEE PESC*, Charleston, S.C., 1999, pp. 1059-1064.

(15) B. Kaku, I. Miyashita, and S. Sone, "Switching loss minimized space vector pwm method for igbt three-level inverter," *IEE Proceedings. Electric Power Applications*, Vol. 144, pp. 182-190, May 1997.

LIST OF REFERENCE NUMERALS 0 central tap terminal
10 3-level VSC
11 intermediate DC circuit
12 sub-circuit
13 AC terminal
C1,C2 capacitor
$D_1$-$D_6$ diode
N negative terminal
P positive terminal
$T_1$-$T_{12}$ switch (transistor) $T_{Ax1}$-$T_{Ax6}$ auxiliary switch (transistor)
$t_1$-$t_{12}$ point of time
$t_{d1}$,$t_{d2}$ duration

The invention claimed is:

1. A Voltage Source Converter (VSC) with Neutral-Point-Clamped (NPC) topology with one or more phases, comprising: an intermediate DC circuit having four capacitances connected in series between a positive terminal and a negative terminal, providing a central tap terminal between the two center capacitances of said four capacitances connected in series, and at least one sub-circuit for generating one phase of an alternating voltage, each sub-circuit comprising:
an AC terminal for supplying a pulsed voltage;
a circuit arrangement of a form of a NPC converter, with:
a first series connection of at least four active switches between said AC terminal and said positive terminal, wherein each active switch has a diode connected in parallel;
a second series connection of at least four active switches between said AC terminal and said negative terminal, wherein each active switch has a diode connected in parallel;
a diode connected between each connection point between the capacitances of said four capacitances connected in series, and further connected to each connection point between the active switches of said first series connection of at least four active switches and second series connection of at least four active switches;
additional first and second auxiliary active switches connected in series between said AC terminal and said positive terminal, wherein the first auxiliary active switch is connected in parallel to two active switches of said first series connection of at least four active switches, and the second auxiliary active switch is connected in parallel to the other two active switches of said first series connection of at least four active switches; and
additional third and fourth auxiliary active switches connected in series between said AC terminal and said negative terminal, wherein the third auxiliary active switch is connected in parallel to two active switches of said second series connection of at least four active switches, and the fourth auxiliary active switch is connected in parallel to the other two active switches of said second series connection of at least four active switches.

2. A Voltage Source Converter (VSC) with Neutral-Point-Clamped (NPC) topology with one or more phases comprising: an intermediate DC circuit having six capacitances connected in series between a positive terminal and a negative terminal, providing a central tap terminal between two center capacitances of said six capacitances connected in series, and at least one sub-circuit for generating one phase of an alternating voltage, each sub-circuit comprising:
an AC terminal for supplying a pulsed voltage;
a circuit arrangement of a form of a NPC converter, with:
first series connection of at least six active switches between said AC terminal and said positive terminal, wherein each active switch has a diode connected in parallel;
a second series connection of at least six active switches between said AC terminal and said negative terminal, wherein each active switch has a diode connected in parallel;
a diode connected between each connection point between the capacitances of said six capacitances connected in series, and further connected to each connection point between the active switches of said first series connection of at least six active switches and second series connection of at least six active switches;
additional first, second and third auxiliary active switches connected in series between said AC terminal and said positive terminal, wherein the first auxiliary active switch is connected in parallel to two active switches of said first series connection of at least six active switches, the second auxiliary active switch is connected in parallel to two other active switches of said first series connection of at least six active switches, and the third auxiliary active switch is connected in parallel to further two other active switches of said first series connection of at least six active switches; and
additional fourth, fifth and sixth auxiliary active switches connected in series between said AC terminal and said negative terminal, wherein the fourth auxiliary active switch is connected in parallel to two active switches of said second series connection of at least six active switches, the fifth auxiliary active switch is connected in parallel to two other active switches of said second series connection of at least six active switches, and the sixth auxiliary active switch is connected in parallel to further two other active switches of said second series connection of at least six active switches.

* * * * *

UNITED STATES PATENT AND TRADEMARK OFFICE
CERTIFICATE OF CORRECTION

PATENT NO.       : 9,543,855 B2
APPLICATION NO.  : 13/669058
DATED            : January 10, 2017
INVENTOR(S)      : Soeiro et al.

It is certified that error appears in the above-identified patent and that said Letters Patent is hereby corrected as shown below:

On the Title Page

Item (72), under "Inventors", in Column 1, Line 3, delete "Vaxjo (SE);" and insert -- Växjö (SE); --, therefor.

In the Specification

In Column 7, Line 14, delete "or –off," and insert -- or turn-off, --, therefor.

In Column 8, Lines 10-11, delete "off Hence," and insert -- off. Hence, --, therefor.

In Column 8, Line 36, delete "$t_3 \rightarrow_5$" and insert -- $t_3 \rightarrow t_5$ --, therefor.

In Column 9, in Table III, delete "$\frac{\text{Junction}}{\Delta T_{j\_T1} > \Delta T_{j\_T2}} \quad \Delta T_{j\_2} > \Delta T_{j\_T1}$" and insert -- $\frac{\text{Junction}}{\Delta T_{j\_T1} > \Delta T_{j\_T2}} \quad \Delta T_{j\_T2} > \Delta T_{j\_T1}$ --, therefor.

In Column 11, Line 36, delete "$T_z$," and insert -- $T_2$, --, therefor.

In Column 11, Line 55, delete "VSC version 10" and insert -- VSC 10 --, therefor.

In Column 13, Lines 25-26, delete "$T_{Ax1}$-$T_{Ax6}$ auxiliary switch (transistor)" and insert the same at Line 26, before "(Transistor)" as a continuation sub-point.

Signed and Sealed this
Twenty-eighth Day of March, 2017

Michelle K. Lee
*Director of the United States Patent and Trademark Office*